Oct. 18, 1960
R. G. ANDERSON
2,956,565
THERAPEUTIC DEVICE
Filed Dec. 13, 1957
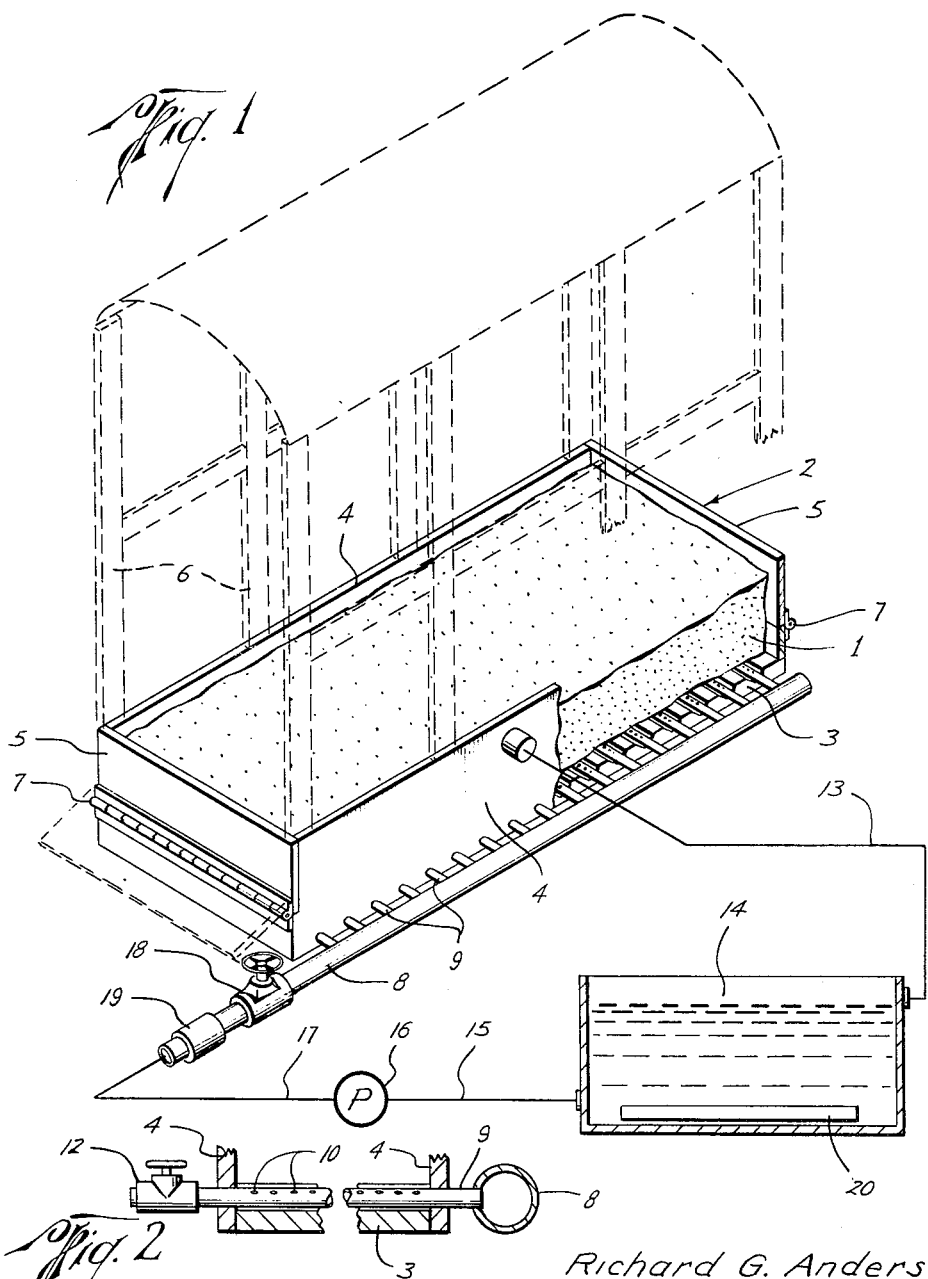
Richard G. Anderson
INVENTOR.
BY
G C Helwig
ATTORNEY

United States Patent Office 2,956,565
Patented Oct. 18, 1960

2,956,565

THERAPEUTIC DEVICE

Richard G. Anderson, Houston, Tex.
(6107 Shoalwood Ave., Austin 5, Tex.)

Filed Dec. 13, 1957, Ser. No. 702,608

9 Claims. (Cl. 128—369)

This invention relates to therapeutic equipment for remedial bathing and massaging treatment of feet and legs of animals, and involves a compact assembly which can be easily transported and put into use at any location.

Stock of all kinds become afflicted with hoof and leg soreness and injury, and horses whose work is running, as in sporting and racing events, are given constant careful conditioning attention and often require the strengthening and curing of tired and strained muscles and tendons. A current treatment for stretched tendons is a painful burning or blistering and tight wrapping to pressure inflamed parts back into place. Such treatment is not always effective and instead can be so brutally harsh as to ruin a valuable animal. Lameness from overexertion and ground pounding shock, and especially on dry brittle hoofs, is somewhat common in the popular two-year olds, whose tendons and bony structure have not yet toughened, and the younger the animal, the more likely it is to need curative attention and to be harmed by severity of treatment.

Leg soreness, hoof injuries, thrush, quarter cracks, hangnails, skin infection, and the like can be treated better and painlessly by allowing the horse to stand or tramp slowly for about thirty minutes several times on each of a few successive days in a soft bed of about kneedeep clean sand and warm water preferably containing mineral salts or other medicament and circulating through the sand. Soft wet sand, in a manner somewhat akin to the action of quicksand, yields to pressure and allows the feet to sink gradually under animal weight, and from time to time the animal will tend to lift one foot after another to gain new footings on top of the soft bed. Reactions of different horses to leg immersion in the wet sand will vary between an infrequent withdrawal through the sand and an almost constant shifting of weight and alternate lifting of the feet. In any case, leg and joint movements so induced and combined with a gentle wet sand rubbing or massaging of the parts moving through the sand and with controlled heat and liquid medicament action, will be remedially effective in stimulating blood circulation, cleansing infection, drawing off stiffness and soreness and adding moisture to the hoofs for increasing pliability and shock cushioning characteristics.

For promoting such corrective and curative treatment, it is an object of this invention to provide improved apparatus comprising a few relatively inexpensive elements inclusive of a foot receiving vat to contain a bed of soft sand in liquid and a liquid recirculating system for jetting flow spouts through the sand at regulated temperature and which assembly can be readily transported to any place of use, as, for example, in a conventional horse trailer, with the vat constituting either a removable unit to be laid on the trailer floor or parts of the permanent floor and side walls of a trailer and into which vat a supply of sand can be placed for treatment purposes. The feature of portability is of importance to horse owners who move about for short stays at different racing grounds and other competitive showings.

In the accompanying drawing, Fig. 1 shows a preferred embodiment of the invention and illustrates in perspective a treatment vat and associated parts to be connected in circuit with a liquid storage tank illustrated in transverse section; Fig. 2 is a transverse section through the floor of the vat at the location of liquid supplying manifold piping; and Fig. 3 is a fragmentary detail of the floor and interfitting piping with the floor in longitudinal section.

Referring to the drawing, a bed 1 of granular solids such as soft clean sand is placed in a container box or vat 2 having a bottom wall or floor 3 of rectangular shape in plan and vertical side walls including a pair of longitudinal walls 4 and a pair of opposite end walls 5 for closing in the four sides of the space above the floor 3. Vat shape and size may vary and dimensions of one hundred four inches long, forty-two inches wide, and eighteen inches high to contain the loose granular material or sand bed to a selected depth within a range of about fourteen inches, are suggested as suitable for the treatment of a racing horse to be brought to stand with all feet in the soft wet bed and to be permitted to sink to a depth somewhere between ankle and knee height. To confine the horse and especially a skittish animal to remain standing in the vat 2, upward wall extensions 6 with an optional top hood covering are preferably added to rise up beside the horse's body and head, and which, along with a tie-down for a halter rope, will minimize the likelihood of the animal rearing and otherwise fighting the treatment and the submergence or sinking of its feet in the soft sand. Such reaction sometimes may occur before the animal becomes accustomed to and learns to enjoy the healing bath. The confining riser structure 6 can be built above the vat 2 and when the vat is mounted in a horse trailer, the confining riser may be the usual trailer superstructure.

A suitable walkway or ramp should be used for walking a horse into and out of the vat. The trailer rear door can double as a ramp when it is not serving as a part of the confining superstructure. Additionally, either or both end walls 5 are shown as hinged, at 7, each along its lower horizontal edge, to swing outwardly and downwardly in providing a combined ramp and door and an entrance and exit opening with a low step. Conventional gasket material should be used along all four edges of the hinged door to seal against liquid leakage during the time the vat contains water.

For treatment purposes, the loose particle solids are wetted by filling the vat with water whereby the granular particles are lubricated for easy sliding on one another and yielding displacement under applied pressure. To avoid sand packing tendency and to maintain the particle grains in a desired state of partially suspended fluidity, a liquid recirculating system includes an arrangement for pressure jetting small liquid streams upwardly from the bottom of the vat. By providing a large number of closely adjacent pressure streams distributed or spread throughout the entire longitudinal and transverse horizontal area, practically all of the solid particles in the bed 1 will be affected by the upflowing liquid so as to stay loose and mobile for bed softness.

For spouting liquid throughout the whole volume of sand and for avoiding dead pockets, the entire bottom of the bed is underlaid by manifold piping which, as shown in the drawing, includes an inlet header conduit 8 extending longitudinally alongside and exteriorly of the vat and feeding a plurality of perforated branch pipes 9 projected in closely spaced apart parallelism transversely across the vat and through both side walls 4—4 in sealed relation thereto. The branch pipe perforations are simply a large number of holes 10 drilled through the pipe wall at axially spaced apart points arranged in angularly related sets to provide a multitude of jet streams directed for flow upwardly and distributed across the width of the vat and in divergently related rows, as is best seen in Fig. 3. As illustrated, certain of the stream delivery apertures 10 are directed vertically and others are directed in upwardly and outwardly inclined planes on both sides of the pipe axis in intersecting relation to the stream planes from adjoining pipes. The several diverging streams may be in axially staggered relation but in any event they should be of such number as to be close together and thereby work through the sand directly above each pipe as well as regions between neighboring pipes of the series.

Each branch pipe 9, as in Fig. 3, is fitted within a transverse depression or groove in the upper face of the vat floor 3. The floor grooves are of smaller width than a hoof and of a depth approximating pipe diameter, whereby the tops of the several pipes and of the floor are flush for a substantially smooth bearing to minimize injury to the thin walled piping and to the feet of the animal should they chance to come into contact. Each branch pipe terminal opposite to that connected with the pressure liquid delivery header 8 is normally closed by a removable cap plug or by a hand valve 12, as illustrated in Fig. 2, so that the pipe end can be opened periodically for flushing out any accumulation of sand particles which may have dropped down through the jet perforations 10 and which unless removed would clog the free flow of fluid.

After percolating through the wet bed, the jet supplied body of water reaches a level near or just above the top of the sand bed and the excess overflows through a standpipe or an opening in one of the side walls. Preferably, the level maintaining overflow opening is screened to exclude sand and is connected with a return conduit 13 for gravity flow to a storage tank 14. Stored liquid from the tank 14 can be withdrawn near the bottom thereof through a conduit 15 joined to the inlet side of a motor driven pump 16 whose pressure outlet side is connected by a conduit 17 with the manifold header pipe 8 to complete the flow circuit. A valve, which can be either a one-way nonreturn valve or a hand adjustable cock, as shown at 18, is contained in the conduit 17 at its connection with the manifold header 8. In addition, the conduit 17 may incorporate an adjustable thermostat switch 19 responsive to the temperature of the pump directed water to regulate the action of a heat exchanger, here indicated as an electrical heater element 20 submerged within the storage tank 14. In this manner water temperature can be readily controlled and ordinarily would be warmed to or appreciably above normal body temperature. The water temperature would, of course, depend on what the animal is being treated for, and for some ailments the selected heat range could extend considerably below body temperature. Clean water alone of fixed or gradually changing temperature and with or without the sand bed will often provide an adequate healing bath, and improved results will sometimes be had from and dictate an additive to the water at the storage tank. Convenient additions contemplated are mineral cleansing salts inclusive of sea, Epsom, and ordinary pickling salts, the benefits and efficacy of which are recognized.

Hydrotherapeutic advantages of hot salt baths are readily obtainable with the equipment. When an animal is standing in the vat, the parts submerged will be flooded with flowing liquid and with the vat containing a soft bed of wet sand, there will additionally occur a mild massaging or rubbing of the parts against sand particles, inasmuch as the water and the sand under foot pressure will yield and flow laterally on the hoof bottom and as the foot sinks, the sides of the hoof, the ankle and the leg move down through and wipe against the wet sand and are washed by the upwardly flowing warm salt water and the wet sand again wipes against the parts as any foot is lifted through the bed and toward the top. In the lifting action a suction is produced under the rising hoof which requires some effort and pulls the wet sand back against and under the foot. The normal animal reaction to sinking and submergence in the wet sand is an exertion of effort to raise the feet and repeated shifting of weight and stepping up exercises the walking and running muscles and joints of the body and legs. Thus a bit of limbering self exercise is encouraged to aid in freeing stiffness and soreness at the same time the parts are receiving the warm soaking bath and sand rubbing treatment for restoring strength and relieving strains and causes of aches and pains and for adding moisture and pliability to condition and improve hoof and bony structure against cracks and tears.

A preferred embodiment of the invention has been set forth by way of illustration and other arrangements of detail and various modifications can be made within the scope of the invention as defined in the appended claims.

What is claimed is:

1. For use as therapeutic equipment and in combination with a bed of wet loose granular particles which readily shift under pressure and which bed is between ankle and knee-deep for an animal standing therein when its feet sink into the loose particles under the weight of the animal, a liquid recirculating system comprising a vat containing said bed of granular particles, a surplus liquid storage tank having an overflow connection leading thereto from the vat at a point above the surface of said particle bed within the vat, a liquid circulating pump connected with the storage tank to withdraw liquid therefrom, a pump supplied series of manifold pipes in the bottom of said vat having jet openings for pressure liquid delivery in separate streams spread throughout substantially the entire horizontal area of the vat and for upward flow through said granular particle bed toward said overflow connection, a heat exchanger active on the liquid in the system and heat exchanger control means responsive to system liquid temperature for controlling heat exchanger action in the maintenance of a preselected liquid temperature range.

2. The equipment as set out in claim 1 wherein the vat has side wall extensions rising above said bed to a height to confine an animal placed therein.

3. The equipment as set out the claim 1 wherein the floor of the vat has openings therein to receive and house said manifold pipes below the upper floor surface.

4. Therapeutic apparatus for the exercise and curative treatment of the walking parts of an animal, including an animal receiving stall having a relatively shallow vat in the floor of the stall, a soft bed of loose sand and liquid contained within the vat as a vat floor covering layer of a depth between ankle and knee height on the animal, said bed being of such softness in relation to the weight of an animal standing therein as to yield slowly under the feet of the animal and accommodate a foot sinking to an extent which is conducive to an animal reaction toward seeking new footings from time to time, a spread of liquid stream jets in the bottom of the vat and beneath said soft wet sand bed, a liquid overflow leading from the vat near the top of the wet sand bed and means to supply pressure liquid to said jets for upward flow through the bed towards said overflow.

5. Therapeutic apparatus for the exercise and curative treatment of the walking parts of an animal, including an animal confining stall whose floor comprises a relatively shallow and liquid tight vat, a soft bed of loose sand and liquid confined against leakage within the vat, said bed having a liquid content tending to partially suspend and separate the sand particles for an approximate quicksand consistency and softness in relation to the weight of an animal standing therein as to yield slowly under the feet of the animal brought to stand on top of the bed and being between ankle and knee depth to accommodate a foot sinking conducive to an animal reaction toward seeking new footings from time to time.

6. Therapeutic apparatus for the exercise and curative treatment of the walking parts of an animal, including a vat, a soft bed of loose sand and liquid contained within the vat, said bed being of such softness in relation to the weight of an animal standing therein as to yield slowly under the feet of the animal and being of such depth as to accommodate a foot sinking to an extent which is conducive to an animal reaction toward seeking new footings from time to time, a spread of liquid stream jets in the bottom of the vat and beneath said soft wet sand bed, a liquid overflow leading from the vat near the top of the wet sand bed, a source of liquid for circulation through said bed from the stream jets to said overflow and means to treat said liquid for increased curative characteristics by regulation of its temperature and composition.

7. Equipment for the therapeutic treatment of animals, comprising an animal confining stall having a floor vat containing a soft bed of wet particle solids extending between ankle and knee depth, manifold piping extended through opposite side walls of the vat and across the bottom of the vat and beneath said bed and provided with liquid directing jets inside the vat, pressure liquid supply means connected with the piping outside one of said side walls and openable closure means normally closing the piping outwardly beyond the other of said side walls and permitting the opening of the piping for straight flowthrough of a pressure liquid and the riddance of any particle solids which may have dropped through said jets.

8. Equipment for the therapeutic treatment of animals, comprising an animal confining stall having a relatively shallow vat defining the floor of the stall and containing a soft bed of loose wet particle grains of a depth between ankle and knee height and into which an animal can be brought to stand and whose softness is such that the feet of the animal gradually sink into the bed, a liquid overflow leading from the vat above the bed of particle grains, a liquid storage tank connected to said overflow and pump means having its suction side connected with the tank and its pressure side connected with the bottom of said vat and operable to flow the liquid upwardly through said vat contained particle bed.

9. In a water recirculating system for the treatment of the legs and feet of an animal, a leakproof vat having side and bottom walls for sealed retention therein of a body of water supplied thereto and into which vat an animal can be brought to stand during treatment, a body of water confined within the vat and a bed of submerged and shiftable sandlike particles overlying the bottom wall of the vat to a level that the feet of an animal brought to stand thereon will sink below the top of the shiftable particle bed, a surplus water storage tank having a water return flow connection thereto from the vat for the overflow of water at a level near the top of said bed for maintaining the spaces between the shiftable particles filled with water, water delivery and manifold piping having pump connection with the storage tank and including a plurality of stream jetting pipes received within spaced apart grooves extended downwardly in the vat bottom wall below the upper surface thereof to a depth substantially corresponding with pipe diameter for a flush relationship of the top surfaces of the bottom wall and the several pipes.

References Cited in the file of this patent

UNITED STATES PATENTS

| | | |
|---|---|---|
| 538,720 | Allen | May 7, 1895 |
| 1,595,410 | Leenhouts | Aug. 10, 1926 |
| 1,715,043 | Oye | May 28, 1929 |
| 1,982,258 | Martin | Nov. 27, 1934 |
| 2,075,933 | Friedlander | Apr. 6, 1937 |
| 2,858,024 | Babcock | Oct. 28, 1958 |